(12) United States Patent
Schuster et al.

(10) Patent No.: US 9,973,129 B2
(45) Date of Patent: May 15, 2018

(54) HVAC COMPONENTS HAVING A VARIABLE SPEED DRIVE WITH OPTIMIZED POWER FACTOR CORRECTION

(71) Applicant: Trane International Inc., Davidson, NC (US)

(72) Inventors: Don A. Schuster, Lindale, TX (US); Chuan Yan, Tyler, TX (US)

(73) Assignee: Trane International Inc., Davidson, NC (US)

(*) Notice: Subject to any disclaimer, the term of this patent is extended or adjusted under 35 U.S.C. 154(b) by 0 days. days.

(21) Appl. No.: 15/180,320

(22) Filed: Jun. 13, 2016

(65) Prior Publication Data

US 2016/0365817 A1 Dec. 15, 2016

Related U.S. Application Data

(60) Provisional application No. 62/174,656, filed on Jun. 12, 2015.

(51) Int. Cl.
*H02P 6/18* (2016.01)
*H02P 23/26* (2016.01)

(52) U.S. Cl.
CPC .................... *H02P 23/26* (2016.02)

(58) Field of Classification Search
CPC .............. F04B 49/06; F04B 2203/0201; F04B 2203/0209; H02P 6/085; H02P 6/182; H02P 2209/07; H02P 27/08; H02M 5/4505
USPC ................ 318/400.34, 459, 500, 798, 400.3
See application file for complete search history.

(56) References Cited

U.S. PATENT DOCUMENTS

| | | | |
|---|---|---|---|
| 3,214,675 A | 10/1965 | Foster | |
| 4,259,845 A | 4/1981 | Norbeck | |
| 4,806,841 A | 2/1989 | Lee et al. | |
| 5,105,096 A | 4/1992 | Waldschmidt et al. | |
| 5,414,609 A | 5/1995 | Levran et al. | |
| 5,603,222 A * | 2/1997 | Dube | F04B 39/06 62/469 |
| 5,923,143 A | 7/1999 | Cosan et al. | |
| 6,480,404 B2 | 11/2002 | Giraud et al. | |
| 6,487,457 B1 | 11/2002 | Hull et al. | |
| 6,622,505 B2 | 9/2003 | Anderson et al. | |
| 6,735,968 B2 | 5/2004 | Kurita et al. | |
| 7,034,498 B2 * | 4/2006 | Kerlin | H02P 7/28 318/400.36 |
| 7,109,680 B2 | 9/2006 | Kubo et al. | |

(Continued)

*Primary Examiner* — Rina Duda
(74) *Attorney, Agent, or Firm* — The Salerno Law Firm, P.C.

(57) ABSTRACT

A power factor optimized variable speed drive unit for an electric motor of an HVAC device is disclosed. In an embodiment, the unit includes a selectively-activatable power factor correction unit operatively associated with a switched mode power supply unit. A power measurement unit measures the input power of the electric motor. A comparator unit compares the motor input power to a predetermined threshold. The comparator unit activates the power factor correction unit when the input power of the electric motor is above the threshold, and deactivates the power factor correction unit when the input power of the electric motor falls below the threshold. In an embodiment, motor input power is determined by the product of motor load current and motor speed.

23 Claims, 5 Drawing Sheets

(56) References Cited

U.S. PATENT DOCUMENTS

| | | |
|---|---|---|
| 7,114,343 B2 | 10/2006 | Kates |
| 7,275,377 B2 | 10/2007 | Kates |
| 7,341,201 B2 | 3/2008 | Stanimirovic |
| 7,412,842 B2 | 8/2008 | Pham |
| 7,469,546 B2 | 12/2008 | Kates |
| 7,484,376 B2 | 2/2009 | Pham |
| 7,565,813 B2 | 7/2009 | Pouchak |
| 7,746,020 B2* | 6/2010 | Schnetzka ............. F25B 49/025 318/611 |
| 7,795,827 B2 | 9/2010 | Jeung |
| 7,797,080 B2 | 9/2010 | Durham, III |
| 7,825,621 B2 | 11/2010 | Wei et al. |
| 7,899,579 B2 | 3/2011 | Durham, III |
| 8,193,756 B2* | 6/2012 | Jadric ................... F25B 49/025 318/448 |
| 8,269,370 B2 | 9/2012 | Haga |
| 8,295,950 B1 | 10/2012 | Wordsworth et al. |
| 8,393,169 B2 | 3/2013 | Pham |
| 8,498,136 B2 | 7/2013 | Shinomoto et al. |
| 8,590,325 B2 | 11/2013 | Pham |
| 8,734,125 B2 | 5/2014 | McSweeney et al. |
| 9,021,819 B2 | 5/2015 | Kates |
| 9,023,136 B2 | 5/2015 | Kates |
| 9,081,394 B2 | 7/2015 | Kates |
| 9,086,704 B2 | 7/2015 | Kates |
| 2005/0278071 A1 | 12/2005 | Durham |
| 2008/0089792 A1* | 4/2008 | Bae ........................ H02P 7/295 417/44.1 |
| 2008/0180055 A1* | 7/2008 | Zargari ............... H02M 1/4216 318/729 |
| 2009/0092502 A1* | 4/2009 | Marcinkiewicz ....... F04B 49/06 417/63 |
| 2010/0191489 A1 | 7/2010 | Zolot |
| 2011/0157942 A1* | 6/2011 | Babcock ............... H02M 1/425 363/126 |
| 2013/0176649 A1* | 7/2013 | Wallis ................... H02H 5/041 361/24 |
| 2014/0012422 A1 | 1/2014 | Kates |
| 2014/0074730 A1 | 3/2014 | Arensmeier et al. |
| 2014/0214227 A1 | 7/2014 | Thornton et al. |
| 2014/0262134 A1 | 9/2014 | Arensmeier et al. |
| 2014/0266755 A1 | 9/2014 | Arensmeier et al. |
| 2014/0297208 A1 | 10/2014 | Arensmeier |
| 2015/0108901 A1 | 4/2015 | Greene et al. |

* cited by examiner

HVAC COMPONENTS HAVING A VARIABLE SPEED DRIVE WITH OPTIMIZED POWER FACTOR CORRECTION

CROSS-REFERENCE TO RELATED APPLICATION

This application claims the benefit of and priority to U.S. Provisional Application Ser. No. 62/174,656 entitled "HVAC COMPONENTS HAVING A VARIABLE SPEED DRIVE WITH OPTIMIZED POWER FACTOR CORRECTION" and filed Jun. 12, 2015, the entirety of which is hereby incorporated by reference herein for all purposes.

BACKGROUND

1. Technical Field

The present disclosure is directed improving energy efficiency of HVAC components, and in particular, to improved apparatus and methods for controlling power factor correction in an HVAC variable speed motor drive which improves efficiency, reduces manufacturing costs, and increases reliability.

2. Background of Related Art

Many heating, ventilating and air conditioning (HVAC) components use variable-speed drive (VSD) systems that improve energy efficiency by matching motor speed to demand load. In contrast to single-speed systems, where, for example, an air conditioning or heat pump compressor drive motor is either stopped, or operating at full speed, in a variable speed system the compressor drive motor is driven at a speed varied in accordance with the amount of cooling or heating required.

The ability to tailor power output of a compressor, pump, or an air mover, rather than simple on-off operation, helps achieve significant energy and cost savings. In some cases, VSD systems consume up to 40% less energy when compared to single-speed systems of equal capacity. Additionally, VSD HVAC systems have benefits beyond energy efficiency. A variable-speed air conditioning system can provide better dehumidification when run at less than full capacity, since the increased cycle times that result from low-speed operation allow more moisture to be condensed out of the air before reaching the temperature set point. Variable speed system tend to run quieter at lower speeds, and since bearings and other mechanical components are subject to reduced wear during low speed operation, service intervals may be extended and reliability enhanced.

A variable speed drive system commonly employs a variable frequency drive (VFD) circuit that includes a non-linear AC-DC power supply unit (PSU) and an inverter. The VFD utilizes the PSU to convert fixed-frequency AC from the utility (typically 50 Hz or 60 Hz) into DC, which is then converted by the inverter into variable-frequency AC to drive the motor. By varying the VFD output frequency, an induction or permanent magnet motor is driven at the desired speed determined by the drive frequency.

Non-linear AC-DC power supplies used in VFD circuits draw non-sinusoidal currents, in part because they use solid-state rectifiers at their inputs in conjunction with filter capacitors, which alters the phase relationship between current and voltage delivered by the utility. These non-sinusoidal currents and altered phase relationships cause the power supply to exhibit poor power factor performance and undesirable harmonic emissions. To address this, such power supplies may include a passive or active power factor correction (PFC) circuit designed to improve power factor performance. Known PFC circuits may have drawbacks. Passive PFC circuits may increase efficiency with a lower power factor, while active PFC circuits tend to have lower efficiency with higher power factor. In addition, known passive PFC arrangements require more capacitance, which add expense, weight, and bulk.

Governing bodies have enacted performance standards with which HVAC units must comply. For example, newly-manufactured HVAC units are subject to energy efficiency standards, such as the Seasonal Energy Efficiency Ratio (SEER) testing standards. The SEER rating attempts to characterize the efficiency of an HVAC system as a single number which is determined by testing the system under a series of precisely-defined load and environmental conditions, known as test points. In another example, HVAC equipment may be subject to standards, such as IEC 61000-3-2, which govern power factor performance and/or harmonic emissions. A VFD system that improves efficiency and power factor performance in a cost-effective manner would be a welcome advance.

SUMMARY

In one aspect, the present disclosure is directed to a variable speed drive for an electric motor of an HVAC device. The variable speed drive includes a power factor correction unit operatively associated with a power supply unit. The power factor correction unit is configured for selective activation. The variable speed drive includes a power determination unit configured to calculate a power parameter of the electric motor, and a comparator unit operatively coupled with the power factor correction unit and the power measurement unit. The comparator unit is configured to activate the power factor correction unit when the input power of the electric motor rises above a first power threshold and to deactivate the power factor correction unit when the input power of the electric motor falls below a second power threshold.

In some embodiments of the variable speed drive, the power parameter of the electric motor may include motor input power and/or motor output power. In some embodiments, the power determination unit comprises a current sensor configured to detect the input current of the electric motor, and a computation unit configured to compute the speed of the electric motor and determine the input power of the electric motor from the input current of the electric motor and the calculated speed of the electric motor. In some embodiments, the speed of the electric motor is computed from a back EMF of the electric motor.

In some embodiments of the variable speed drive, the first power threshold is selected to cause the power factor correction unit to be activated when the input power of the electric motor corresponds to a SEER test point selected from the group consisting of 82HIGH and 95 HIGH. In some embodiments, the second power threshold is selected to cause the power factor correction unit to be deactivated when the input power of the electric motor corresponds to a SEER test point selected from the group consisting of 67LOW, 82LOW, and 87INT.

In some embodiments of the variable speed drive, the first power threshold and the second power threshold are selected to cause the power factor correction unit to be activated when the input power of the electric motor is above a first predetermined percentage of the maximum input power of the electric motor, and to cause the power factor correction unit to be deactivated when the input power of the electric motor is below a second predetermined percent of the maximum input power of the electric motor.

In another aspect, the present disclosure is directed to an HVAC device. The HVAC device includes an electric motor and a variable speed drive unit configured to drive the electric motor. The variable speed drive unit includes a power factor correction unit operatively associated with a power supply unit. The power factor correction unit configured is for selective activation. The variable speed drive unit includes a power determination unit configured to determine a power parameter of the electric motor, and a comparator unit operatively coupled with the power factor correction unit and the power measurement unit. The comparator unit is configured to activate the power factor correction unit when the input power of the electric motor rises above a first power threshold and to deactivate the power factor correction unit when the input power of the electric motor falls below a second power threshold.

In some embodiments of the HVAC device, the power parameter of the electric motor may include a motor input power and/or a motor output power. In some embodiments, the power determination unit may include a current sensor configured to detect the input current of the electric motor. In some embodiments, the power determination unit includes a computation unit which computes the speed of the electric motor, and determines the input power of the electric motor from the input current of the electric motor and a calculated speed of the electric motor. In some embodiments, the speed of the electric motor is computed from a back EMF of the electric motor. In some embodiments, the first power threshold is selected to cause the power factor correction unit to be activated when the input power of the electric motor corresponds to a SEER test point selected from the group consisting of 82HIGH and 95 HIGH. In some embodiments, wherein the second power threshold is selected to cause the power factor correction unit to be deactivated when the input power of the electric motor corresponds to a SEER test point selected from the group consisting of 67LOW, 82LOW, and 87INT.

In some embodiments of the HVAC device, the first power threshold is selected to cause the power factor correction unit to be activated when the input power of the electric motor is slightly above a first predetermined percentage of the maximum input power of the electric motor. In some embodiments, the second power threshold is selected to cause the power factor correction unit to be deactivated when the input power of the electric motor corresponds to slightly a second predetermined percentage of the maximum input power of the electric motor.

In yet another aspect, the present disclosure is directed to a method of controlling a power factor correction unit of a variable speed drive of an electric motor. In an embodiment, the method includes determining a power parameter of the electric motor, activating the power factor correction unit when the power parameter exceeds a first predetermined threshold, and deactivating the power factor correction unit when the power parameter is less than a second predetermined threshold.

In some embodiments of the method, the power parameter of the electric motor may include a motor input power and/or a motor output power.

In some embodiments of the method, the determining includes sensing an input current of the electric motor; computing the speed of the electric motor; and multiplying the input current and the speed. In some embodiments, computing the speed of the electric motor includes determining a back EMF of the electric motor.

In some embodiments of the method, the first predetermined threshold corresponds to a power parameter of the electric motor operating at a SEER test point of 82HIGH or 95HIGH. In some embodiments of the method, the second predetermined threshold corresponds to a power parameter of the electric motor operating at a SEER test point of 67LOW, 82LOW, or 87INT.

BRIEF DESCRIPTION OF THE DRAWINGS

Various embodiments of the disclosed system and method are described herein with reference to the drawings wherein.

Figure 1:
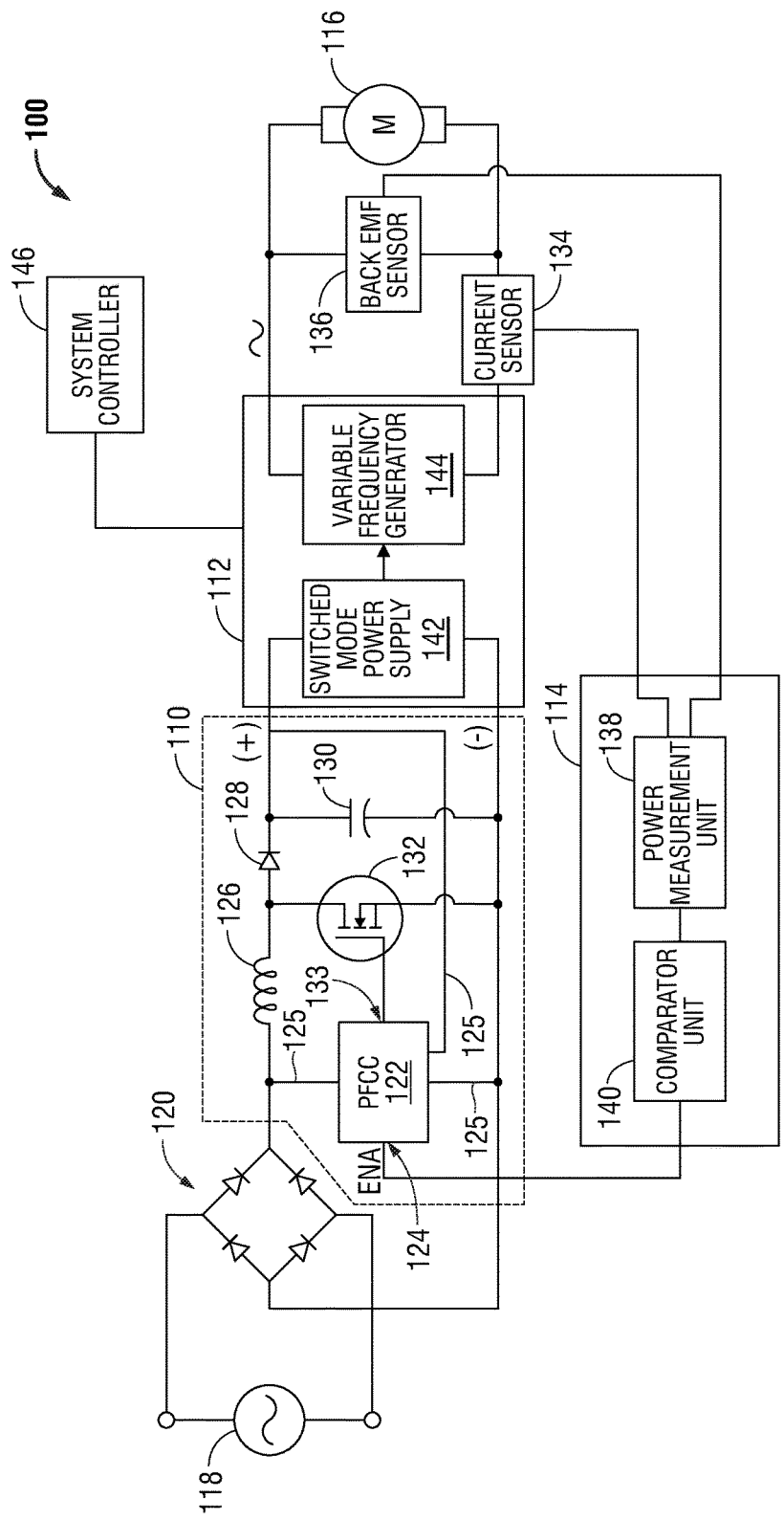
FIG. 1 is a diagram of a variable speed drive with optimized power factor correction in accordance with an embodiment of the present disclosure.

The various aspects of the present disclosure mentioned above are described in further detail with reference to the aforementioned figures and the following detailed description of exemplary embodiments.

DETAILED DESCRIPTION

Particular illustrative embodiments of the present disclosure are described hereinbelow with reference to the accompanying drawings; however, the disclosed embodiments are merely examples of the disclosure, which may be embodied in various forms. Well-known functions or constructions and repetitive matter are not described in detail to avoid obscuring the present disclosure in unnecessary or redundant detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. In this description, as well as in the drawings, like-referenced numbers represent elements which may perform the same, similar, or equivalent functions. The word "exemplary" is used herein to mean "serving as an example, instance, or illustration." Any embodiment described herein as "exemplary" is not necessarily to be construed as preferred or advantageous over other embodiments. The word "example" may be used interchangeably with the term "exemplary."

The present disclosure is described herein in terms of functional block components and various processing steps. It should be appreciated that such functional blocks configured to perform the specified functions may be embodied in analog circuitry, digital circuitry, and/or instructions executable on a processor. For example, the present disclosure may employ various discrete components, integrated circuit components (e.g., memory elements, processing elements, logic elements, look-up tables, and the like) which may carry out a variety of functions, whether independently, in cooperation with one or more other components, and/or under the control of one or more processors or other control devices. It should be appreciated that the particular implementations described herein are illustrative of the disclosure and its best mode and are not intended to otherwise limit the scope of the present disclosure in any way.

Referring to FIG. 1, an exemplary embodiment of an energy-efficient variable speed drive (VSD) system 100 is shown. VSD system 100 includes a full-wave rectifier 120 that receives alternating current power from a power source 118 such as an electrical utility grid, and supplies unfiltered direct current power to a power factor correction unit (PFCU) 110. PFCU 110 performs power factor correction and delivers direct current power to variable frequency inverter 112, which, in turn, delivers variable-frequency alternating current power to electrical motor 116 to drive motor 116 at varying rotational speeds, typically measured in revolutions per minute (RPM). An optimization unit 114 measures the input power delivered to motor 116, compares the input power to one or more predetermined thresholds, and selectively activates and deactivates PFCU 110 depending on the input power.

PFCU 110 includes a power factor correction controller (PFCC) 122 having a control input 124 which receives a control signal from optimization unit 114 to enable optimization unit 114 to selectively enable (activate) or disable (bypass) the operation of PCFU 110, and one or more sensing inputs 125 through which PFCC measures input voltage (e.g., from full-wave rectifier 120), output voltage (e.g., delivered to variable frequency inverter 112), current, and other electrical parameters. PFCC 122 includes a switching output 133 that controls the gate of MOSFET 132. In the example embodiment as shown in FIG. 1, PFCU 110 employs a boost topology that includes inductor 126, power MOSFET 132, diode 128, and capacitor 130. PFCC 122 executes a control scheme whereby MOSFET 132 is turned on at constant frequency, and is turned off when the sum of the positive ramp of the current flowing through inductor 126 and a compensating ramp reaches a sinusoidal current reference that is synchronized with, and proportional to, the input line voltage. This forces the instantaneous current flow through PFCU 110 to closely track the instantaneous line voltage, which can achieve power factor corrections of up to 95% or better. PFCC 122 may execute additional or alternative power factor correction control schemes, and may include, for example, an L4981B Power Factor Corrector chip manufactured by STMicroelectronics of Geneva, Switzerland.

Variable frequency inverter 112 receives DC input voltage from PFCU 110 and generates an AC output voltage of variable frequency which drives motor 116 at variable speed. In the example embodiment, inverter 112 includes a switched-mode power supply 142 which receives the output voltage received from PFCU 110 to power variable frequency generator 144 to generate the alternating current drive power necessary to operate motor 116 at the desired speed. In some embodiments, inverter 112 may employ any suitable alternative circuit arrangement to convert DC input voltage received from PFCU 110 into the AC output voltage required to drive motor 116.

A system controller 146 provides one or more control signals to variable frequency inverter 112 to vary the output frequency of inverter 112 to effectuate the operation of motor 116 at the desired speed. In embodiments, system controller 146 may include a thermostat, an HVAC system controller, and/or an embedded device controller included within HVAC equipment.

Optimization unit 114 includes in operative communication a power measurement unit 138 and a comparator unit 140. Power measurement unit 138 is operatively coupled to a current sensor 134 that is coupled in series with motor 116 and configured to sense the current drawn by motor 116. In various embodiments, back EMF of motor 116 may either be measured and/or calculated. In the FIG. 1 embodiment, power measurement unit 138 is operatively coupled to a back EMF sensor 136 that is coupled in parallel with motor 116 to sense the back EMF generated by motor 116 during operation. Since back EMF is directly related to the speed of motor 116, and since the power used by motor 116 is related to the product of its current draw and speed, power measurement unit 138 is able to determine the input power of motor 116 under any given operating condition. Note that, while in the present embodiment, the speed of motor 116 is determined from back EMF, other embodiments may advantageously employ other speed determination techniques, including without limitation an optical or magnetic tachometer, motor-induced ripple measurements, and other suitable techniques.

Power measurement unit 138 communicates the input power of motor 116 to comparator unit 140. Comparator unit 140 compares the input power of motor 116 to a predetermined threshold to determine whether PFCU 110 should be enabled or disabled. In some embodiments, the predetermined threshold is selected to enable PFCU 110 at a power level between SEER test points 87INT and 82HIGH. In some embodiments, PFCU 110 is enabled when the motor input power is slightly above the SEER test point known as 87INT. For example, consider an example embodiment where an HVAC unit has the following SEER test points and corresponding motor input power levels:

95HIGH—3638 W
82HIGH—3046 W
87INT—1615 W
82LOW—861 W
67LOW—604 W

In this example, comparator unit 140 turns on power factor correction (PFC) when input power rises above about 1650 W, and turns off PFC when input power falls below about 1650 W. To prevent undesirable oscillations around the threshold, in embodiments a first PCF turn-on threshold and a second PCF turn-off threshold are employed to provide hysteresis. In this embodiment, the second turn off threshold is set slightly lower than the first threshold which prevents vacillation between the PFC on state and the PFC off state when motor input power varies around the switching point. In these contexts, "slightly" as used herein indicates a difference between the turn-on threshold and turn-off threshold that is greater than the ordinary power level fluctuation expected during normal operation of motor 116.

While the example embodiment of FIG. 1 shows an active PFC topology (e.g., booster topology), other PFC topologies may be advantageously employed within the scope of the present disclosure, including without limitation, interleave PFC topology, bridgeless PFC topology, or any active PFC topology now or in the future known.

Embodiments of the present disclosure are believed to have advantages over prior art systems. By controlling power factor correction based upon motor input power, embodiments of the present disclosure enable power factor correction under those load conditions, e.g., high load conditions, which benefit most from power factor correction in terms of optimizing overall system efficiency. Additionally, because embodiments in accordance with the present disclosure enable system designers to design power factor correction circuits which will be operating in a known targeted operating region, smaller and/or fewer capacitors are necessary when compared to conventional prior art systems which enable power factor correction without regard to motor input power. This reduces parts count, reduces manufacturing and shipping costs, requires less space for bulky capacitor banks within HVAC equipment, offers better options for packaging and compact physical designs, and increases reliability.

Figure 2:
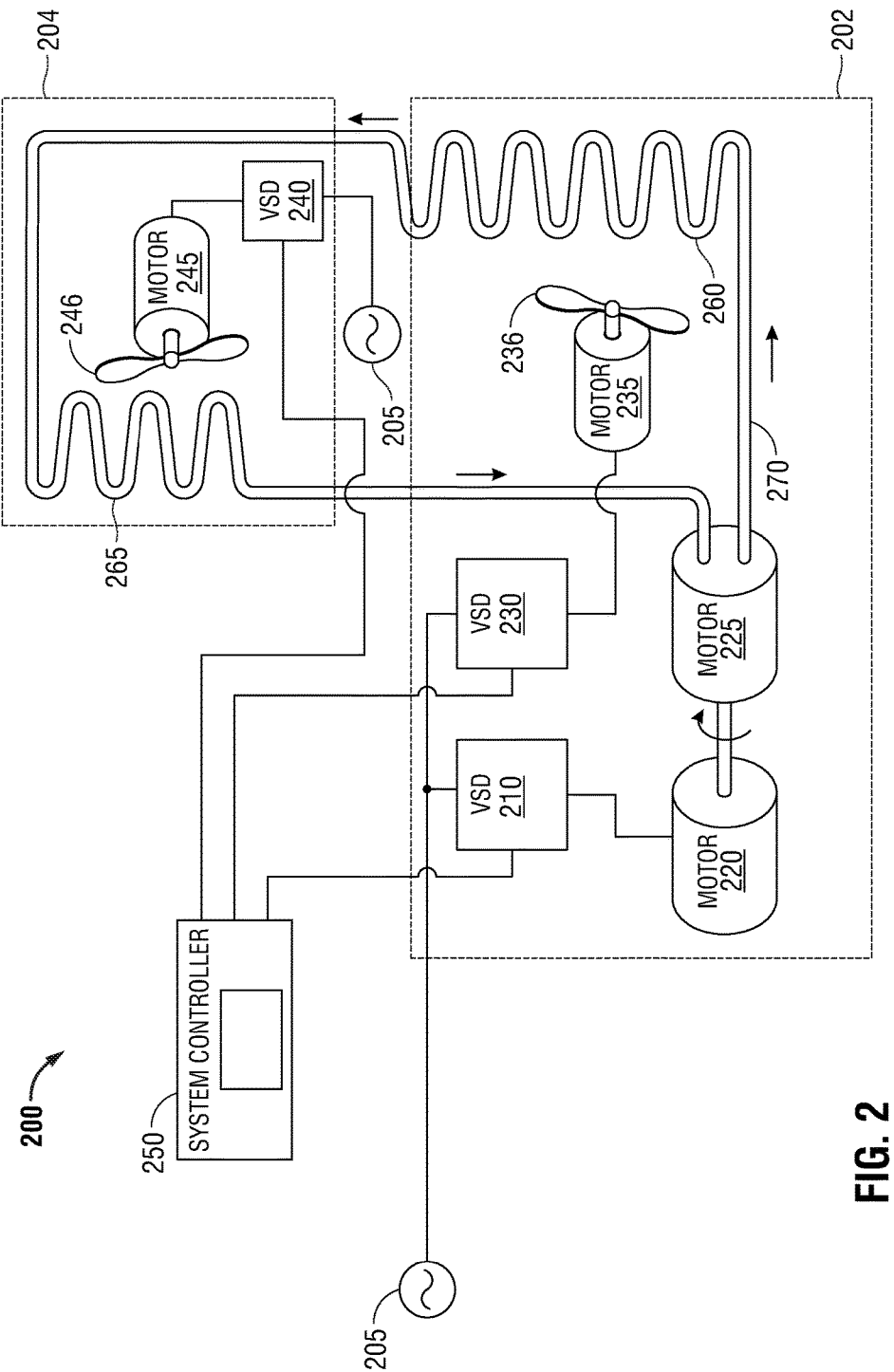
FIG. 2 is a diagram of an HVAC system incorporating a variable speed drive with optimized power factor correction in accordance with an embodiment of the present disclosure.

Turning to FIG. 2, an example embodiment of an HVAC system 200 incorporating energy-efficient VSDs in accordance with the present disclosure is shown. Split HVAC system includes an outdoor unit 202 and an indoor unit 204. Outdoor unit 202 includes an electrical motor 220 that drives compressor 225, and an electrical motor 235 that drives fan 236. Outdoor unit 202 includes an energy-efficient variable speed drive (VSD) unit 210 as described hereinabove that is configured to drive motor 220 at a variable speed, which, in turn, drives compressor 225 at variable speed. Outdoor unit 202 includes a second VSD unit 230 as described hereinabove that drives motor 235 and fan 236 at variable speed. Indoor unit 204, which may be referred to in the art as an air handler, includes an electrical motor 245 that drives blower 246. A VSD drive unit 240 as described hereinabove drives the motor 245/blower 246 combination at variable speed. VSD drive units 210, 230, and 240 receive power from a power source 205, such as the electrical utility grid, and VSD drive units 210, 230, and 240 are operatively coupled to a system controller 250, which may include a thermostat, HVAC controller, and the like. In some embodiments, system controller 250 may directly and/or indirectly control the individual speeds of motor 220, 235, and/or 240 via each motor's respective VFD 210, 230, and 240. It should be understood that, while the present example embodiment illustrates outdoor unit 202 configured as an air conditioner condensing unit, outdoor unit 202 may be configured as a heat pump.

It should be noted that, although a split HVAC system is illustrated in the example embodiment of FIG. 2, embodiments of the present disclosure may be advantageously employed in other HVAC system arrangements, including without limitation, package HVAC systems in which the components shown in outdoor unit 202 and indoor unit 204 are included in a single housing, window-mounted HVAC units, and chillers.

In use, outdoor unit 202 and indoor unit 204 interoperate to perform a vapor-compression refrigeration cycle. Refrigerant, such as R-410A, is pressurized by compressor 225 and flows through conduit 270 to condensing coil 260. Air driven by fan 236 blows through condensing coil 260 and removes heat from the refrigerant, causing the refrigerant to cool and condense. Cooled refrigerant continues through evaporator coil 265 where it expands, absorbing heat from indoor air driven by blower 246 through evaporator coil 265, which cools the indoor air. Advantageously, during use, the motor speeds of motor 220, 230, and/or 240 may be varied, each with optimal power factor correction, to tailor the operation of HVAC system 200 in accordance with the required demand loads.

Figure 3:
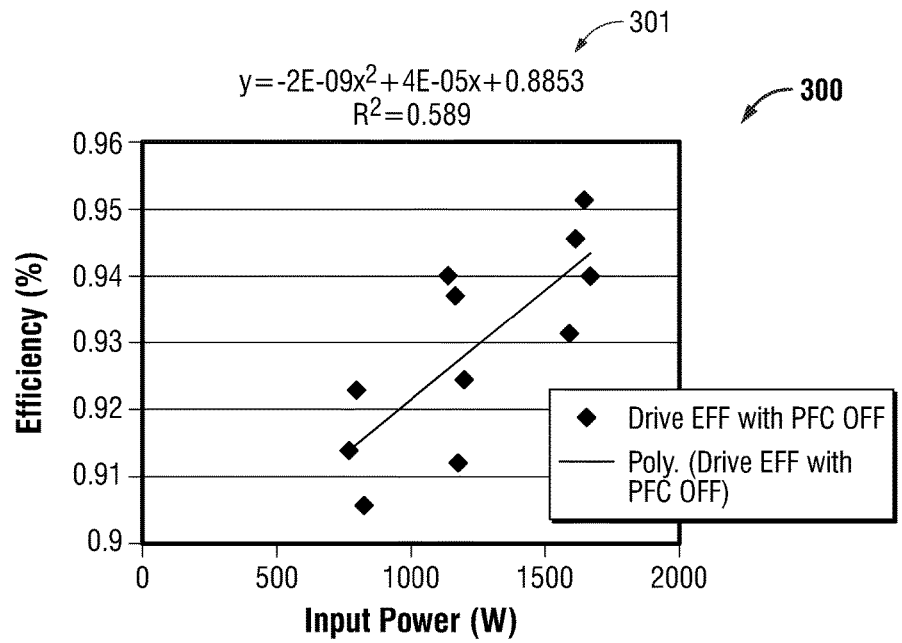
FIG. 3 is a graph portraying the efficiency of a variable speed drive in accordance with the present disclosure with power factor correction deactivated.
Figure 4:
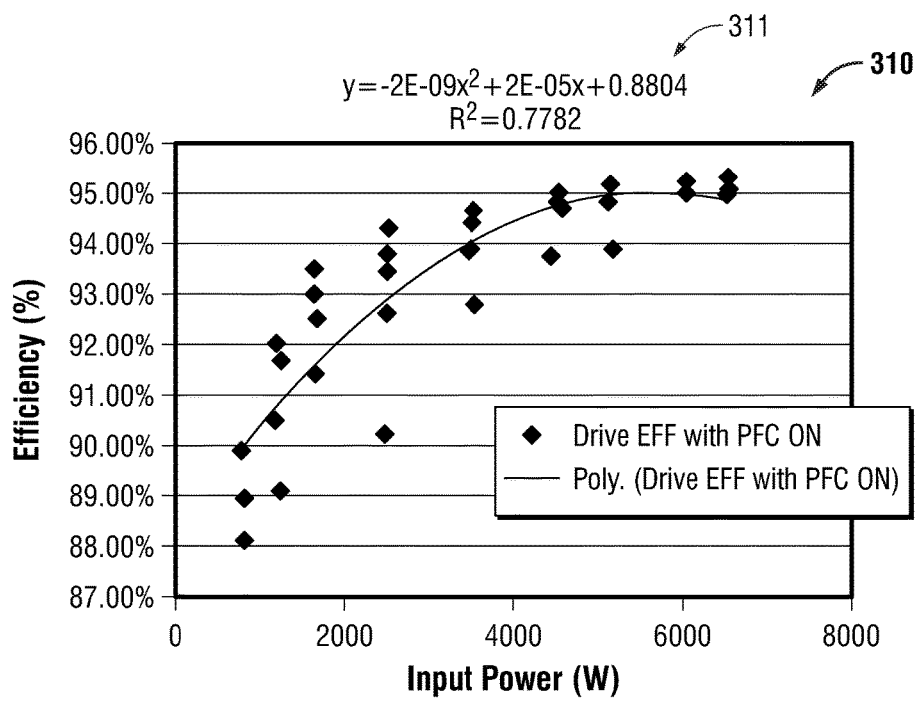
FIG. 4 is a graph portraying the efficiency of a variable speed drive in accordance with the present disclosure with power factor correction activated.

The advantages of the energy-efficient VSD systems described herein are illustrated with reference to FIGS. 3 and 4 which show observed measurements indicated by diamonds, and a curve-fitting polynomial which describes the observed efficiency. Graph 300 illustrates drive efficiency with PFC deactivated, which may be expressed or curve-fitted as polynomial 301 in the form $y=-2E-09x^2+4E-05x+0.8853$. Graph 310 illustrates drive efficiency with PFC activated, which may be curve-fitted as polynomial 311 in the form $y=-2E-09x^2+2E-05x+0.8804$. As can be seen, drive efficiency with PFC deactivated (FIG. 3) is approximately 3% greater when compared to drive efficiency with PFC activated (FIG. 4). However, when PFC is deactivated, higher ripple voltage and/or current is introduced to the DC capacitors, which increases capacitor thermal stress, shortens component lifetime and decreases reliability. The prior art solution of simply adding more capacitors to spread out the impact of ripple voltage and/or current impact (which increases cost and bulk) is overcome by techniques described in the present disclosure, which seeks to keep PFC deactivated to the greatest extent possible by determining the conditions under which to selectively activate PFC in order to achieve higher effective PFC ratios without the use of expensive, bulky capacitors. In one aspect, embodiments of the present invention advantageously utilize motor input power as an indicator of when to enable and/or disable PFC.

Figure 5:
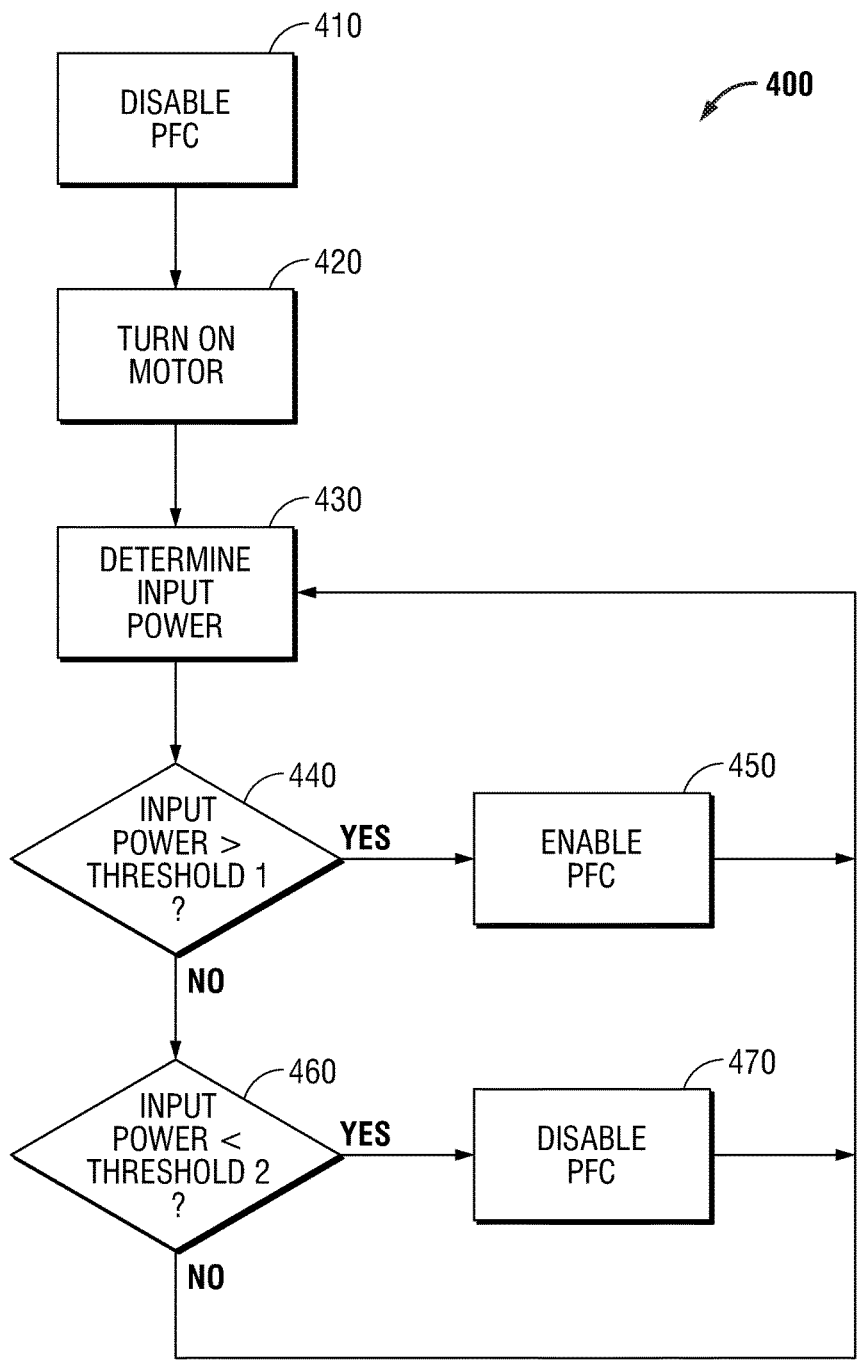
FIG. 5 is a flowchart illustrating a method of optimizing power factor correction in a variable speed drive in accordance with an embodiment of the present disclosure.

FIG. 5 illustrates an embodiment of a method 400 of operating an electric motor VSD unit with optimized power factor correction in accordance with the present disclosure is shown. The method initializes with step 410 where the power factor correction unit is disabled. In embodiments, step 410 is performed upon initial power-up of the VSD unit, and, additionally or alternatively, prior to starting up the electric motor driven by the VSD unit. In step 420, the motor is turned on and its output shaft begins rotating at a speed determined by the VSD unit.

In step 430, the input power to the electric motor is determined. In embodiments, the input power is calculated from the product of motor input current and motor speed, e.g., the rotational speed of the motor's output shaft. In embodiments, the motor speed may be derived from a measurement of the back EMF generated by the motor. In step 440, the motor input power is compared to a first threshold. If the input power exceeds the first threshold, the power factor correction unit is enabled in step 450, and the method iterates with the step 430. Otherwise, in step 460, the motor input power is compared to a second threshold. If the input power is less than the second threshold, the power factor correction unit is disabled in step 470. The method iterates with the step 430 to continue the process for as long as the motor is running.

Figure 6:
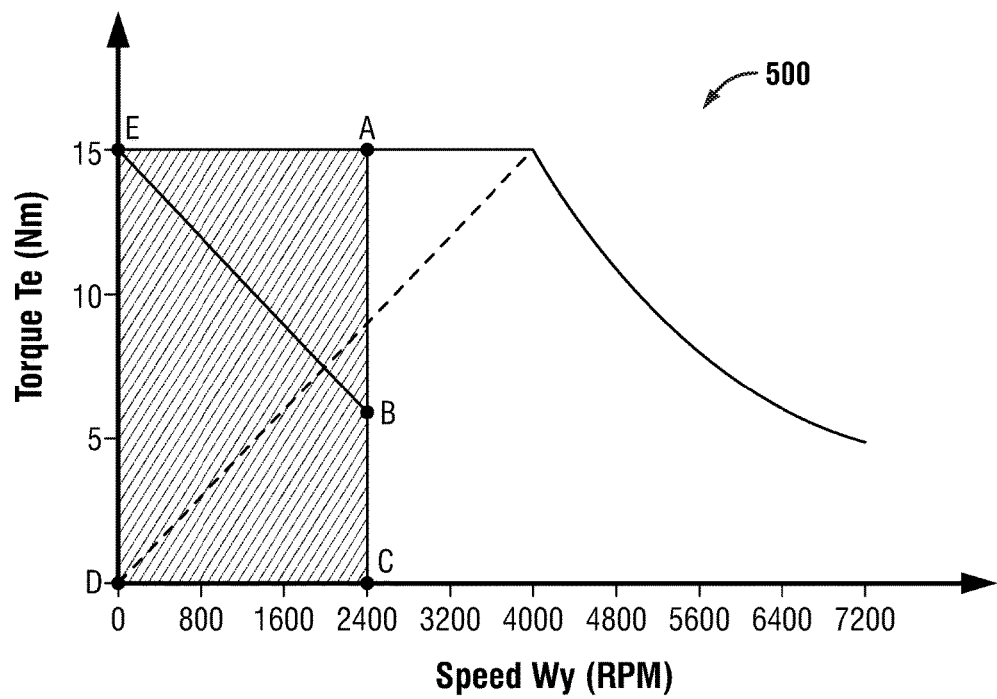
FIG. 6 is a graph illustrating capacitor sizing requirements of embodiments of a power factor correction unit in accordance with the present disclosure.

Turning to FIG. 6, the advantages of the disclosed power factor correction unit are further illustrated in graph 500, which shows a relationship between motor speed (X axis) and motor torque (Y axis). At SEER test point INT87, motor speed equals 2400 RPM and input power equals 1600 W. Prior art power factor correction units which toggle PFC on/off based on motor speed requires capacitors to be sized to accommodate the maximum input power which may occur at 2400 RPM, regardless of actual work being done. In the present example, maximum power at 2400 RPM is 4800 W, which corresponds to point A seen in FIG. 6. As shown in graph 500, the capacitors in the prior art must be sized to accommodate the operating region defined by ACDE.

In contrast, a power factor correction unit in accordance with the present disclosure toggles PFC on/off in accordance with motor power, e.g., motor input power. This arrangement advantageously allows capacitors to be sized to accommodate the actual input power at which PFC is activated, which here is 1600 W (again, indicative of SEER test point INT87). This results in significantly reduced capacitor size while still providing the required efficiency ratings. As seen in graph 500, the capacitors in the prior art need only be sized to accommodate the operating region defined by BCDE.

ASPECTS

It is noted that any of aspects 1-7, any of aspects 8-15, and/or any of aspects 16-20 may be combined with each other in any combination.

Aspect 1. A variable speed drive for an electric motor of an HVAC device, comprising a power factor correction unit operatively associated with a power supply unit, the power factor correction unit configured for selective activation; a power determination unit configured to calculate a power parameter of the electric motor; and a comparator unit operatively coupled with the power factor correction unit and the power measurement unit, the comparator unit configured to activate the power factor correction unit when the input power of the electric motor rises above a first power threshold and to deactivate the power factor correction unit when the input power of the electric motor falls below a second power threshold.

Aspect 2. The variable speed drive in accordance with aspect 1, wherein the power parameter of the electric motor is selected from the group consisting of motor input power and motor output power.

Aspect 3. The variable speed drive in accordance with any of aspects 1-2, wherein the power determination unit comprises a current sensor configured to detect the input current of the electric motor; and a computation unit configured to compute the speed of the electric motor and determine the input power of the electric motor from the input current of the electric motor and the calculated speed of the electric motor.

Aspect 4. The variable speed drive in accordance with any of aspects 1-3, wherein the speed of the electric motor is computed from a back EMF of the electric motor.

Aspect 5. The variable speed drive in accordance with any of aspects 1-4, wherein the first power threshold is selected to cause the power factor correction unit to be activated when the input power of the electric motor corresponds to a SEER test point selected from the group consisting of 82HIGH and 95HIGH.

Aspect 6. The variable speed drive in accordance with any of aspects 1-5, wherein the second power threshold is selected to cause the power factor correction unit to be deactivated when the input power of the electric motor corresponds to a SEER test point selected from the group consisting of 67LOW, 82LOW, and 87INT.

Aspect 7. The variable speed drive in accordance with any of aspects 1-6, wherein the first power threshold and the second power thresholds are selected to cause the power factor correction unit to be activated when the input power of the electric motor is above a first predetermined percentage of the maximum input power of the electric motor, and to cause the power factor correction unit to be deactivated when the input power of the electric motor is below a second predetermined percent of the maximum input power of the electric motor.

Aspect 8. An HVAC device, comprising an electric motor; and a variable speed drive unit configured to drive the electric motor, the variable speed drive comprising a power factor correction unit operatively associated with a power supply unit, the power factor correction unit configured for selective activation; a power determination unit configured to determine a power parameter of the electric motor; and a comparator unit operatively coupled with the power factor correction unit and the power measurement unit, the comparator unit configured to activate the power factor correction unit when the input power of the electric motor rises above a first power threshold and to deactivate the power factor correction unit when the input power of the electric motor falls below a second power threshold.

Aspect 9. The HVAC device in accordance with aspect 8, wherein the power parameter of the electric motor is selected from the group consisting of motor input power and motor output power.

Aspect 10. The HVAC device in accordance with any of aspects 8-9, wherein the power determination unit comprises a current sensor configured to detect the input current of the electric motor; and a computation unit configured to compute the speed of the electric motor and determine the input power of the electric motor from the input current of the electric motor and the calculated speed of the electric motor.

Aspect 11. The HVAC device in accordance with any of aspects 8-10, wherein the speed of the electric motor is computed from a back EMF of the electric motor.

Aspect 12. The HVAC device in accordance with any of aspects 8-11, wherein the first power threshold is selected to cause the power factor correction unit to be activated when the input power of the electric motor corresponds to a SEER test point selected from the group consisting of 82HIGH and 95HIGH.

Aspect 13. The HVAC device in accordance with any of aspects 8-12, wherein the second power threshold is selected to cause the power factor correction unit to be deactivated when the input power of the electric motor corresponds to a SEER test point selected from the group consisting of 67LOW, 82LOW, and 87INT.

Aspect 14. The HVAC device in accordance with any of aspects 8-13, wherein the first power threshold is selected to cause the power factor correction unit to be activated when the input power of the electric motor is slightly above a first predetermined percentage of the maximum input power of the electric motor.

Aspect 15. The HVAC device in accordance with any of aspects 8-14, wherein the second power threshold is selected to cause the power factor correction unit to be deactivated when the input power of the electric motor corresponds to slightly a second predetermined percentage of the maximum input power of the electric motor.

Aspect 16. A method of controlling a power factor correction unit of a variable speed drive of an electric motor, comprising determining a power parameter of the electric motor; activating the power factor correction unit when the power parameter exceeds a first predetermined threshold; and deactivating the power factor correction unit when the power parameter is less than a second predetermined threshold.

Aspect 17. The method in accordance with aspect 16, wherein the power parameter of the electric motor is selected from the group consisting of motor input power and motor output power.

Aspect 18. The method in accordance with any of aspects 16-17, wherein the determining includes sensing an input current of the electric motor; computing the speed of the electric motor; and multiplying the input current and the speed.

Aspect 19. The method in accordance with any of aspects 16-18, wherein computing the speed includes determining a back EMF of the electric motor.

Aspect 20. The method in accordance with any of aspects 16-19, wherein the first predetermined threshold corresponds to a power parameter of the electric motor corresponding to a SEER test point selected from the group consisting of 82HIGH and 95HIGH; and wherein the second predetermined threshold corresponds to a power parameter of the electric motor corresponding to a SEER test point selected from the group consisting of 67LOW, 82LOW, and 87INT.

Particular embodiments of the present disclosure have been described herein, however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in any appropriately detailed structure.

What is claimed is:

1. A variable speed drive for an electric motor of an HVAC device, comprising:
    a power factor correction unit operatively associated with a power supply unit, the power factor correction unit configured for selective activation, the power factor correction unit having a boost topology comprising an inductor and a MOSFET, wherein the MOSFET is turned on at a constant rate and turned off when the current flowing through the inductor reaches a sinusoidal current reference that is synchronized with and proportional to a line voltage input of the variable speed drive;
    a power determination unit configured to calculate a power parameter of the electric motor; and
    a comparator unit operatively coupled with the power factor correction unit and the power measurement unit, the comparator unit configured to activate the power factor correction unit when the input power of the electric motor rises above a first power threshold and to deactivate the power factor correction unit when the input power of the electric motor falls below a second power threshold.

2. The variable speed drive in accordance with claim 1, wherein the power parameter of the electric motor is selected from the group consisting of motor input power and motor output power.

3. The variable speed drive in accordance with claim 1, wherein the power determination unit comprises:
    a current sensor configured to detect the input current of the electric motor; and
    a computation unit configured to:
    compute the speed of the electric motor; and
    determine the input power of the electric motor from the input current of the electric motor and the calculated speed of the electric motor.

4. The variable speed drive in accordance with claim 3, wherein the speed of the electric motor is computed from a back EMF of the electric motor.

5. The variable speed drive in accordance with claim 1, wherein the first power threshold is selected to cause the power factor correction unit to be activated when the input power of the electric motor corresponds to a SEER test point selected from the group consisting of 82HIGH and 95HIGH.

6. The variable speed drive in accordance with claim 1, wherein the second power threshold is selected to cause the power factor correction unit to be deactivated when the input power of the electric motor corresponds to a SEER test point selected from the group consisting of 67LOW, 82LOW, and 87INT.

7. The variable speed drive in accordance with claim 1, wherein the first power threshold and the second power thresholds are selected to cause the power factor correction unit to be activated when the input power of the electric motor is above a first predetermined percentage of the maximum input power of the electric motor, and to cause the power factor correction unit to be deactivated when the input power of the electric motor is below a second predetermined percentage of the maximum input power of the electric motor.

8. The variable speed drive in accordance with claim 1, wherein the first power threshold is selected to cause the power factor correction unit to be activated when the input power of the electric motor is slightly above a first predetermined percentage of the maximum input power of the electric motor.

9. The variable speed drive in accordance with claim 1, wherein the second power threshold is selected to cause the power factor correction unit to be deactivated when the input power of the electric motor corresponds to slightly below a second predetermined percentage of the maximum input power of the electric motor.

10. An HVAC device, comprising:
    an electric motor;
    a driven component operatively coupled to the electric motor; and
    a variable speed drive unit configured to drive the electric motor, the variable speed drive comprising:
    a power factor correction unit operatively associated with a power supply unit, the power factor correction unit configured for selective activation, the power factor correction unit having a boost topology comprising an inductor and a MOSFET, wherein the MOSFET is turned on at a constant rate and turned off when the current flowing through the inductor reaches a sinusoidal current reference that is synchronized with and proportional to a line voltage input of the variable speed drive;
    a power determination unit configured to determine a power parameter of the electric motor; and
    a comparator unit operatively coupled with the power factor correction unit and the power measurement unit, the comparator unit configured to activate the power factor correction unit when the input power of the electric motor rises above a first power threshold and to deactivate the power factor correction unit when the input power of the electric motor falls below a second power threshold.

11. The HVAC device in accordance with claim 10, wherein the power parameter of the electric motor is selected from the group consisting of motor input power and motor output power.

12. The HVAC device in accordance with claim 10, wherein the power determination unit comprises:
    a current sensor configured to detect the input current of the electric motor; and
    a computation unit configured to:
    compute the speed of the electric motor; and
    determine the input power of the electric motor from the input current of the electric motor and the calculated speed of the electric motor.

13. The HVAC device in accordance with claim 12, wherein the speed of the electric motor is computed from a back EMF of the electric motor.

14. The HVAC device in accordance with claim 10, wherein the first power threshold is selected to cause the power factor correction unit to be activated when the input power of the electric motor corresponds to a SEER test point selected from the group consisting of 82HIGH and 95HIGH.

15. The HVAC device in accordance with claim 10, wherein the second power threshold is selected to cause the power factor correction unit to be deactivated when the input power of the electric motor corresponds to a SEER test point selected from the group consisting of 67LOW, 82LOW, and 87INT.

16. The HVAC device in accordance with claim 10, wherein the first power threshold is selected to cause the power factor correction unit to be activated when the input power of the electric motor is slightly above a first predetermined percentage of the maximum input power of the electric motor.

17. The HVAC device in accordance with claim 10, wherein the second power threshold is selected to cause the power factor correction unit to be deactivated when the input power of the electric motor corresponds to slightly below a second predetermined percentage of the maximum input power of the electric motor.

18. The HVAC device in accordance with claim 10, wherein the driven component is selected from the group consisting of a compressor, a fan, and a blower.

19. A method of controlling a power factor correction unit of a variable speed drive of an electric motor, the power factor correction unit having a boost topology including an inductor and a MOSFET, comprising:
   causing an instantaneous current flow through the power factor correction unit to track an instantaneous line voltage input of the variable speed drive by:
   turning the MOSFET on at a constant rate; and
   turning the MOSFET off when the current flowing through the inductor reaches a sinusoidal current reference that is synchronized with and proportional to a line voltage input of the variable speed drive;
   determining a power parameter of the electric motor;
   activating the power factor correction unit when the power parameter exceeds a first predetermined threshold; and
   deactivating the power factor correction unit when the power parameter is less than a second predetermined threshold.

20. The method in accordance with claim 19, wherein the power parameter of the electric motor is selected from the group consisting of motor input power and motor output power.

21. The method in accordance with claim 19, wherein the determining includes:
   sensing an input current of the electric motor;
   computing the speed of the electric motor; and
   multiplying the input current and the speed.

22. The method in accordance with claim 21, wherein computing the speed includes determining a back EMF of the electric motor.

23. The method in accordance with claim 19, wherein the first predetermined threshold corresponds to a power parameter of the electric motor corresponding to a SEER test point selected from the group consisting of 82HIGH and 95HIGH; and
   wherein the second predetermined threshold corresponds to a power parameter of the electric motor corresponding to a SEER test point selected from the group consisting of 67LOW, 82LOW, and 87INT.

* * * * *